(Model.)
2 Sheets—Sheet 1.
E. H. BURGHARDT.
Apple Parer, Corer and Slicer.
No. 241,842. Patented May 24, 1881.
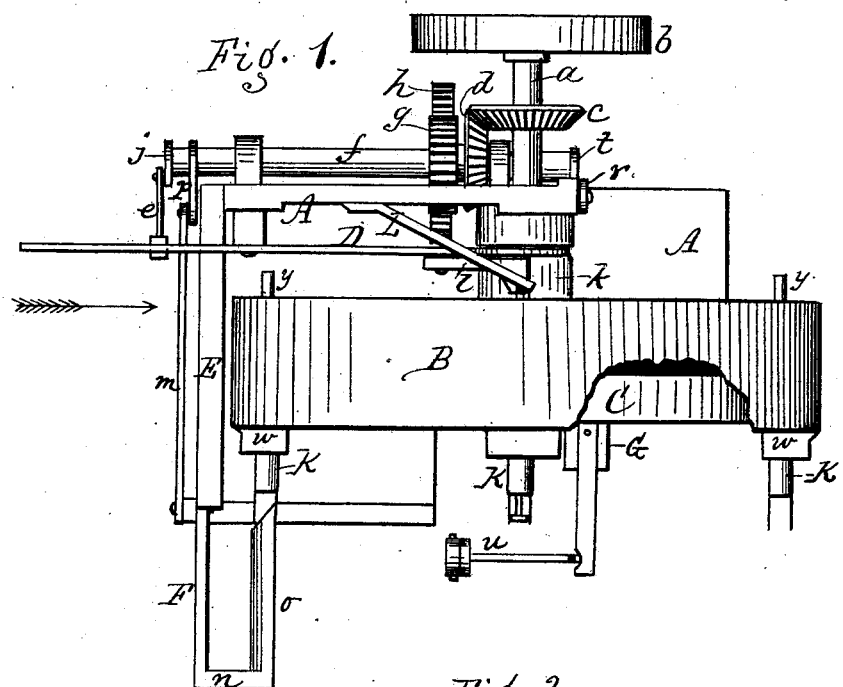
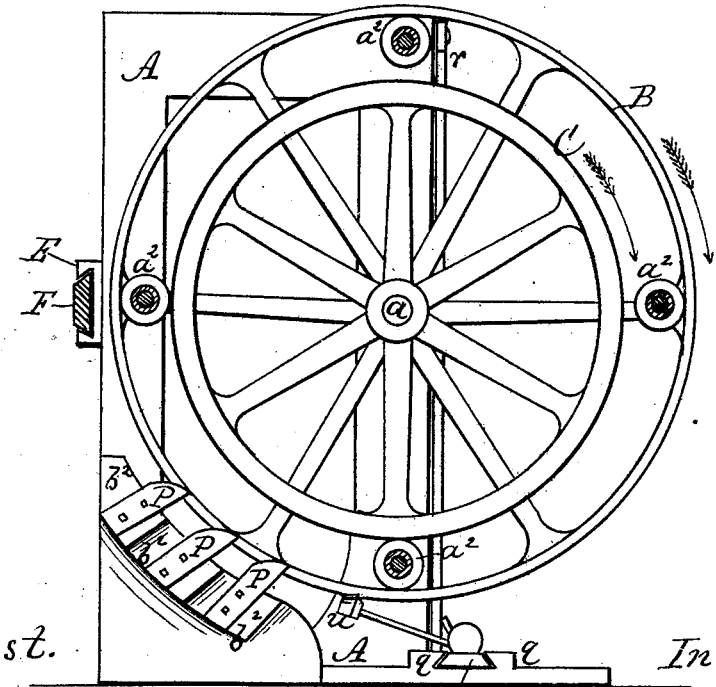
Attest.
R. E. White
J. H. Hopkins.
Inventor.
Edward H. Burghardt,
R. F. Osgood,
Atty.

(Model.)
E. H. BURGHARDT.
Apple Parer, Corer and Slicer.
No. 241,842.  
2 Sheets—Sheet 2.  
Patented May 24, 1881.
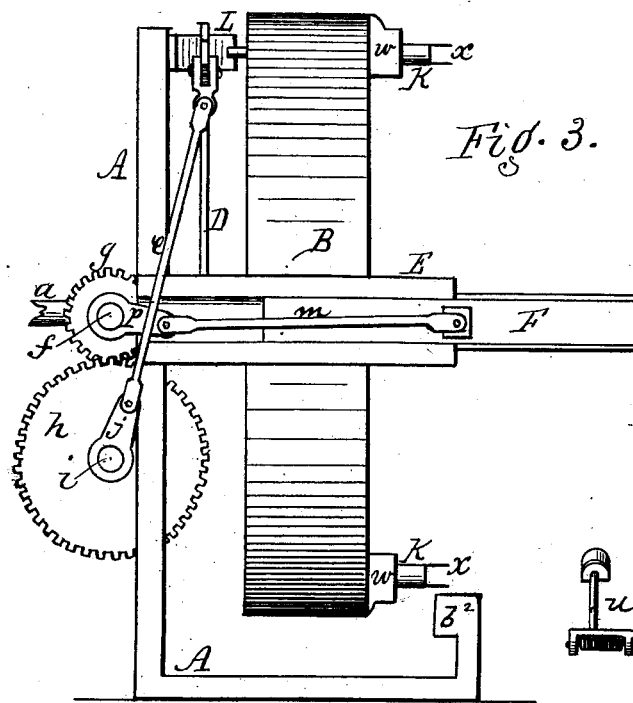
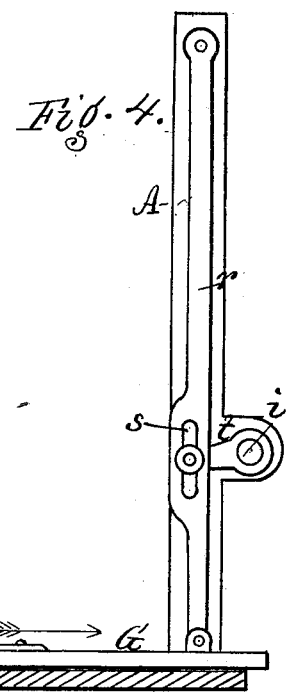
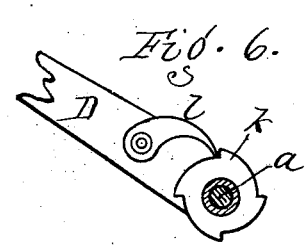
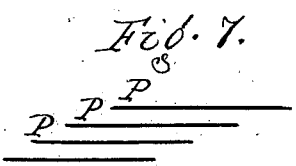
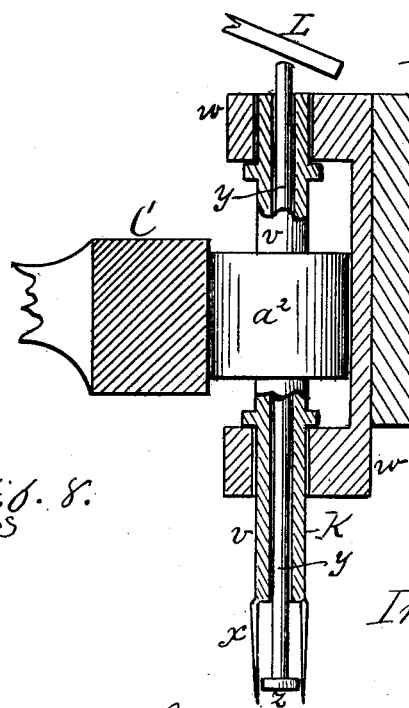
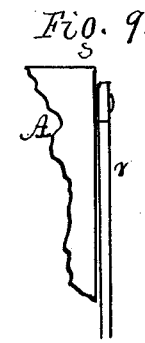
Attest.  
R. E. White  
J. H. Hopkins
Inventor.  
Edward H. Burghardt  
R. L. Osgood,  
atty.
N. PETERS, Photo-Lithographer, Washington, D. C.

UNITED STATES PATENT OFFICE.

EDWARD H. BURGHARDT, OF ROCHESTER, NEW YORK.

APPLE PARER, CORER, AND SLICER.

SPECIFICATION forming part of Letters Patent No. 241,842, dated May 24, 1881.

Application filed December 20, 1880. (Model.)

*To all whom it may concern:*

Be it known that I, EDWARD H. BURGHARDT, of Rochester, Monroe county, New York, have invented a certain new and useful Improvement in Apparatus for Paring, Slicing, and Coring Apples and other Fruits; and I do hereby declare that the following is a full, clear, and exact description of the same, reference being had to the accompanying drawings, in which—

Figure 1 is a plan of the machine. Fig. 2 is a front elevation of the same. Fig. 3 is a side elevation looking in the direction of the arrow, Fig. 1. Fig. 4 is an elevation of the devices for operating the paring-knife. Fig. 5 is a cross-section, on an enlarged scale, of the rims of the two wheels, and a plan, partially in section, of one of the spindles and friction-wheels for giving rotary motion to the apple or other fruit which is being acted upon. Figs. 6, 7, 8, and 9 are detail views.

My improvement relates to an apparatus for paring, slicing, and coring apples or other fruits in a continuous manner by inserting the same upon forks attached to the revolving spindles on a turning disk or wheel, so that as fast as the apples are inserted upon the forks they will be pared, sliced, cored, and the cores forced off from the forks without any intermittent or reverse action, as in ordinary machines for the purpose.

The machine is constructed as follows:

A is a frame, of any suitable kind, in which are mounted the two revolving wheels B C, the first being the wheel to which are attached the revolving spindles, and the last being simply a friction or other gear wheel for imparting motion to the spindles. The wheel C is attached to and revolves with a shaft, $a$, which rests in suitable bearings in the main frame. The wheel B, however, is mounted loosely or has an independent bearing upon a sleeve of the frame, so that independent motion can be given to it. The wheel B has a wide rim, and the rim C rests within it, being of considerably smaller diameter and being set slightly eccentric to the outer wheel, for a purpose presently to be described.

On the outer end of the shaft $a$ is a pulley or crank-wheel, $b$, by which the power is imparted. On said shaft is also a bevel-gear, $c$, which engages with a corresponding bevel-gear, $d$, on a counter-shaft, $f$. On shaft $f$ is a small spur-pinion, $g$, which engages with a larger spur-wheel, $h$, on a shaft, $i$, located below the shaft $f$.

$k$ is a ratchet-wheel attached to the back of the wheel B, and revolving with it.

D is a rock-lever, having its fulcrum upon the center $a$, and extending upward and outward laterally over the side of the machine. $e$, Fig. 3, is a pitman, which connects the upper end of the rock-lever with a crank, $j$, on the end of counter-shaft $i$.

To the rock-lever D is pivoted a pawl, $l$, which engages with the ratchet $k$. It will be seen that at each revolution of crank $j$ the pawl will be drawn back and thrown forward, thereby turning the ratchet $k$ and wheel B a quarter-revolution.

E, Figs. 1 and 3, is a guide or way which projects forward from the frame outside the wheel B, and parallel with its axis; and F is a slide which moves in the guide, being operated by a pitman, $m$, which connects with the crank $p$ on shaft $f$. On the outer end of the slide is an offset or head, $n$, to which is attached a coring device, $o$, consisting of an open section of tube, which extends inward toward the wheel B and comes in line with the spindles, as will be hereinafter described. At each revolution of the crank $p$ the slide, with the coring device attached, will be thrown out and drawn in to an extent equal to the length of the core of the apple or other fruit to be acted on.

G is a slide located in ways $q\,q$ of the base of the frame, beneath the wheel B. To the rear end is pivoted a rock-lever, $r$, which is pivoted at the opposite end to the top of the main frame, so as to swing around said pivot. In the length of the lever is a slot, $s$, with which engages a crank, $t$, secured to the end of shaft $i$. By the action of this crank the slide is moved forward and back around its top pivot a distance sufficient to carry the knife around the surface of the fruit to pare it, and then carry it back again.

To the outer end of the slide is attached the paring-knife $u$, which may be of any of the known forms. By the use of this arrangement for operating the knife a variable motion of the knife is produced—that is, in paring the ends of the apple a slower movement of the knife is produced than in paring the center portion, for the reason that in paring the ends, the crank being more nearly in a horizontal position, as shown in Fig. 4, it produces less motion upon the rock-lever r than when in a vertical position. By this means a better action is produced, as the curved surface of the ends of the fruit require a longer action of the knife to remove the peel than the center straight portion.

In the face of the rim of the wheel B are set a series of spindles, K K K K. Their number may be more or less, as desired, but four are shown in the drawings. Each of these spindles consists of a hollow tube, $v$, which has its bearings in lugs $w$ $w$, attached to the inside of the rim of the wheel, and projects some distance beyond the face of the wheel, with a fork, $x$, at its outer end, and of an interior rod, $y$, which rests loosely in the tube and is free to move endwise, said rod having preferably a disk or head, $z$, at its outer end, which rests within the tines of the fork, as shown in Fig. 5.

On the tube $v$ is fastened a friction-roller, $a^2$, which, by coming in contact with the periphery of the wheel C, receives rotary motion and imparts the same to the spindle. The wheel C being eccentric in the outer wheel, B, as before described, only the lower friction-rollers, $a^2$ $a^2$, will be in gear, the upper ones being out of engagement, and consequently stationary.

On the back side of the wheel B, and attached to the top of the main frame, is an inclined camway, L, against which the rear projecting ends of the plungers $y$ strike as they come up at the top of the wheel, thereby forcing the plunger out through the tube and forcing the core from off the fork.

P P P are a series of knives attached to blocks $b^2$ $b^2$ $b^2$, and forming the slicing-knives. The blocks $b^2$ $b^2$ $b^2$ are graded or arranged in steps, so that the knives are offset from each other, thereby cutting slices of uniform thickness. They also are arranged in succession one after another, as shown in the diagram Fig. 7, so as not to cut opposite each other.

The operation is as follows: The apples are inserted on the forks, one after another, as they come around to the position shown at the right in Figs. 1 and 2. In this position the spindles are out of gear and stationary. As the wheel B is turned the apple is carried downward, and as it approaches the parer the friction-roller comes into gear, revolving the spindle, and at the same time motion is given to the slide G, causing the knife to be carried across the apple, paring the same. From this point the apple, still revolving, is carried to the series of knives P P, which cut grooves in them clear in to the core. From this point the grooved apple, still revolving, is carried up to the coring device $o$, which is forced into and through the apple surrounding the core, and being the section of a circle, and, the apple revolving, the grooved slices are cut off by the coring device and fall down, while the core still remains upon the fork. From this point the spindle, with the core adhering, is carried up to the camway L, and the plunger $y$ is forced out, thereby forcing the core off the fork and leaving it free for applying another apple. When the apple is inserted upon the fork it presses back the plunger $y$ into its first position. If desired, a spring may be employed for producing the reaction of the plunger. Other gearing than that described may be used for giving motion to the spindles, and other means may also be employed for operating the coring and paring devices.

By the means above described the action of inserting the apples upon the spindles, paring them, slicing them, coring them, and removing the cores is continuous, and is produced by constantly moving a wheel forward, thereby doing very rapid work, and avoiding the intermittent action that is necessary in ordinary machines, and avoiding the rehandling of the fruit as it goes through the successive operations. By cutting or grooving into the apples by the slicing-knives before the core is removed, and afterward cutting around the core to remove the slices, the slices are left in entire rings and in solid form, and the result is much better than where the core is first cut out and the fruit is afterward sliced, as in that case the fruit is weakened by taking out the core, and is frequently broken in the act of slicing.

Having thus described my invention, what I claim as new, and desire to secure by Letters Patent, is—

1. The combination, with the revolving wheel or disk B, of the spindle or spindles K, capable of an independent revolving motion, and provided with a fork or forks, $x$, for the attachment of the fruit, as herein shown and described.

2. The combination of the exterior wheel or disk, B, provided with the independently-revolving spindles K K, and the interior wheel, C, set eccentrically within the exterior wheel, and arranged to give motion to the spindles when they reach the paring, slicing, and coring devices by means of gears, but to release said spindles when in the position for attaching the fruit to the forks, as herein shown and described.

3. The combination of the hollow spindle K and the interior rod or plunger, $y$, extending through the spindle and operated by a device in the rear, the spindle having a fork on its front end and the end of the plunger resting within the fork, as shown and described, and for the purpose specified.

4. The combination, with the wheel B, provided with a series of spindles having forks for holding the fruit, of an inclined camway, L, at the top and in the rear of the wheel, and reaching nearly to the wheel, for the purpose of forcing the plunger forward and removing the core, as described.

5. In a machine for coring fruit, the coring-knife o, consisting of a long blade curved in cross-section to conform to the shape of the core, and movable in and out, in combination with a revolving spindle having a fork for holding the fruit, whereby the action of coring is performed by revolving the fruit and entering the knife around the core, as herein set forth.

6. The combination of the curved coring-knife o, the slide F, to which it is attached, and the guideway E, in which the slide moves, whereby the coring-knife reciprocates when motion is given to it, as herein shown and described.

7. The combination of the slide G, to which the paring-knife is attached, the rock-lever r, and the crank t, as and for the purpose specified.

8. In combination with a revolving spindle carrying the fruit, the series of stationary knives P P P, arranged at proper distance apart to cut grooves into the fruit for slicing the same, as herein shown and described.

In witness whereof I have hereunto signed my name in the presence of two subscribing witnesses.

EDWARD H. BURGHARDT.

Witnesses:
R. F. OSGOOD,
JACOB SPAHN.